United States Patent
Olson

(10) Patent No.: US 10,055,322 B2
(45) Date of Patent: Aug. 21, 2018

(54) INTERPRETING SIGNALS RECEIVED FROM REDUNDANT BUSES

(71) Applicant: HEWLETT PACKARD ENTERPRISE DEVELOPMENT LP, Houston, TX (US)

(72) Inventor: Alex Gunnar Olson, Houston, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 84 days.

(21) Appl. No.: 15/025,565

(22) PCT Filed: Sep. 30, 2013

(86) PCT No.: PCT/US2013/062599
§ 371 (c)(1),
(2) Date: Mar. 29, 2016

(87) PCT Pub. No.: WO2015/047386
PCT Pub. Date: Apr. 2, 2015

(65) Prior Publication Data
US 2016/0217053 A1  Jul. 28, 2016

(51) Int. Cl.
*G06F 11/00* (2006.01)
*G06F 11/30* (2006.01)
*G06F 11/16* (2006.01)
*G06F 11/22* (2006.01)

(52) U.S. Cl.
CPC ...... *G06F 11/3027* (2013.01); *G06F 11/1625* (2013.01); *G06F 11/221* (2013.01)

(58) Field of Classification Search
CPC . G06F 11/3027; G06F 11/1625; G06F 11/221
See application file for complete search history.

(56) References Cited

U.S. PATENT DOCUMENTS

| | | | | |
|---|---|---|---|---|
| 5,422,877 A * | 6/1995 | Brajczewski | ....... | G06F 11/2007 340/2.9 |
| 5,796,964 A * | 8/1998 | Bass | ....... | G06F 13/36 710/305 |
| 6,052,752 A * | 4/2000 | Kwon | ....... | G06F 13/4018 710/306 |
| 6,918,068 B2 * | 7/2005 | Vail | ....... | G06F 11/2005 710/38 |

(Continued)

FOREIGN PATENT DOCUMENTS

| | | |
|---|---|---|
| EP | 1760939 A1 | 3/2007 |
| EP | 1883193 A2 | 1/2008 |

(Continued)

OTHER PUBLICATIONS

The Multiplexer, Nov. 10, 2012, Electronics—Tutorials, pp. 1-2.*

(Continued)

*Primary Examiner* — Bryce P Bonzo
*Assistant Examiner* — Jonathan D Gibson
(74) *Attorney, Agent, or Firm* — Michael A. Dryja

(57) ABSTRACT

A technique includes receiving a first signal from a first bus, and receiving a second signal from a second bus. The first and second buses are used for redundant communications. The technique includes interpreting the first and second signals to derive a bus data input signal for a controller based at least in part on detection of a predetermined bus fault.

11 Claims, 5 Drawing Sheets

(56) References Cited

U.S. PATENT DOCUMENTS

| | | |
|---|---|---|
| 2003/0192000 A1 | 10/2003 | Vail et al. |
| 2006/0101184 A1 | 5/2006 | Hegarty |
| 2007/0061631 A1 | 3/2007 | Nakamura |
| 2007/0268973 A1 | 11/2007 | Fanson |
| 2009/0106606 A1 | 4/2009 | Duan et al. |
| 2009/0276666 A1* | 11/2009 | Haley ................ G06F 11/2007 714/47.2 |
| 2011/0126082 A1 | 5/2011 | Pickel et al. |
| 2012/0231663 A1 | 9/2012 | Dozier et al. |
| 2013/0094353 A1 | 4/2013 | Monroe et al. |
| 2016/0217053 A1* | 7/2016 | Olson ................ G06F 11/1625 |

FOREIGN PATENT DOCUMENTS

| | | |
|---|---|---|
| TW | 200511682 A | 3/2005 |
| TW | 201015292 A | 4/2010 |

OTHER PUBLICATIONS

CAFC, Recognicorp LLC v. Nintendo Co., pp. 1-11 (Year: 2017).*
International Searching Authority, The International Search Report and the Written Opinion, dated Jun. 19, 2014, 10 Pages.
Proerzza, J. et al.; "A Low-cost Fail-safe Circuit for Fault-tolerant Control Systems"; Sep. 5-8, 1999; pp. 887-890; vol. 2.

* cited by examiner

INTERPRETING SIGNALS RECEIVED FROM REDUNDANT BUSES

BACKGROUND

In an automobile-based control system or industrial automation system, peripheral devices, such as sensors and actuators, may communicate using a controller area network (CAN) bus. The CAN bus typically has a pair of differential communication lines that are driven in synchronization with a clock signal to serially indicate data. One of more peripherals at a given location may communicate with the CAN bus through the use of an associated CAN bus controller and transceiver. The CAN controller regulates the format/protocol of the CAN bus messaging, and the transceiver translates voltage levels between the CAN bus and the CAN bus controller.

DETAILED DESCRIPTION

Figure 1:
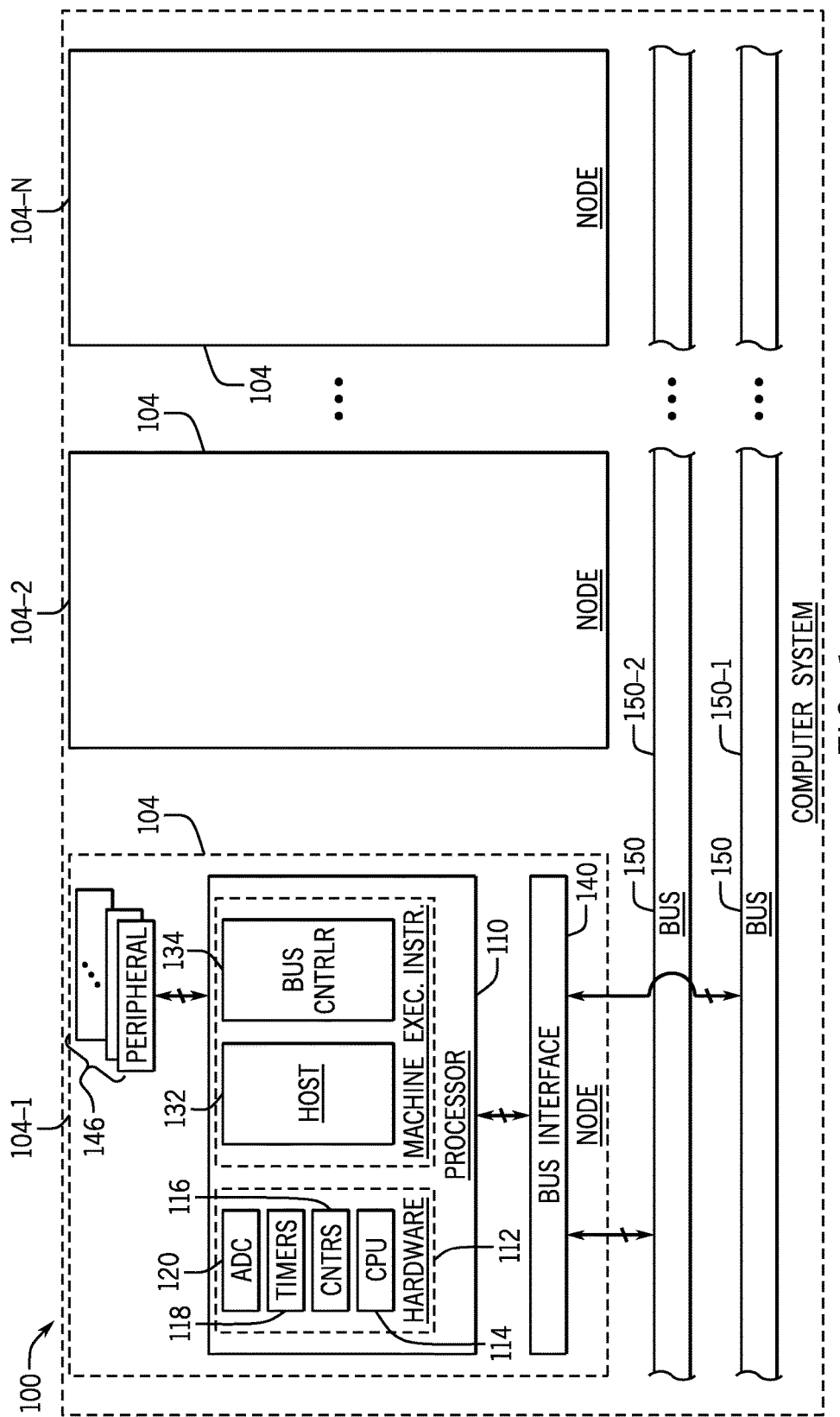
FIG. 1 is a schematic diagram of a computer system that includes redundant controller area network (CAN) buses according to an example implementation.

Referring to FIG. 1, in accordance with example implementations, a computer system 100 includes one or multiple nodes 104 (N example nodes 104-1, 104-2, . . . , 104-N, being depicted in FIG. 1 as examples), which communicate with each other using a set of redundant buses 150 (two buses 150-1 and 150-2, being depicted in FIG. 1 as examples). In this regard, due to the shared nature of communication over a given bus 150, the bus 150 may become a single point of failure. For example, a single bent connector pin on a given bus device may cause an electrical short on the bus 150, which may disrupt communication among the nodes 104.

The redundant bus architecture provides a relatively more robust, fault tolerant form of communication by providing an alternative communication path should the communication on a given bus become impaired. It is noted that although two buses 150 are depicted in FIG. 1, the computer system 100 may have three, four or more buses to form a set of redundant buses, in accordance with further example implementations.

The redundant buses 150 concurrently indicate the same data bit (i.e., a data bit formed from the logical value represented by data bit lines) if no faults are present. However, if a bus fault occurs, the data bits differ, i.e., one bus 150 may provide the current data signal, whereas the bus 150 with the fault does not. As described herein, a given node 104 interprets the signals received from the redundant buses 150 for purposes of deriving the correct bus data signal based on whether a certain bus fault (described below) has been detected.

As a more specific example, in accordance with example implementations discussed herein, the nodes 104 and the buses 150 form a controller area network (CAN). It is noted, however, that other networks and other redundant buses employing other bus communication protocols may be used, in accordance with further implementations.

In accordance with example implementations, the bus 150 employs serial communication in which a pair of data lines of the bus 150 differentially indicates, or represents, a serial stream of data bits. This stream is synchronized to a clock signal. The serial data represents message payload data, node identifiers, and so forth. At a given time, one of the nodes 104 is granted use of the buses 150, and as such, may transmit one or more messages via the buses 150 to a receiving node 104. Deciding which node 104 is granted the present right to transmit on the buses 150, also called "arbitration," may be achieved, according to example implementations, through the use of node identifications (IDs); and dominant and recessive bits.

As an example, a given node 104 may request use of the buses 150 by serially communicating its ID to the buses 150. In this manner, the ID of the node 104 may be a preamble sequence of zeros followed by another sequence of ones and zeros. When multiple nodes 104 concurrently request the buses 104, the nodes 104 concurrently serially furnish their IDs to the buses 150, and the arbitration scheme selects the node 104 whose ID bit is the last ID bit to be "dominant." In this regard, in accordance with example implementations, a "dominant" bit is associated with a logic zero, and a "recessive" bit is associated with logic one. Initially during the serial ID transmission, all of the nodes 104 transmit dominant bits due to the above-described ID preamble of zeros; but eventually, one of the nodes 104 (the arbitration winner) transmits a dominant bit, while the remaining nodes 104 vying for the buses 150 transmit recessive bits.

In general, each node 104, in accordance with example implementations, includes a bus interface 140. For purposes of transmitting bus data, a CAN bus controller 134 of the node 104 generates data, which the bus interface 140 redundantly drives onto the data lines of the buses 150-1 and 150-2. For purposes of receiving bus data, the bus interface 140 and the bus controller 134 cooperate to logically combine the data signals from the redundant buses 150-1 and 150-2 and select the logically combined data signals in a fault-tolerant manner. More particularly, as described in more detail below, in accordance with example implementations, the bus interface 140 logically combines the bus signals according to two different logic functions to provide two corresponding signals for selection by the bus controller 134: one of the signals correctly represents the bus data when 1.) no fault occurs or 2.) a recessive bus fault (described below) occurs; and the other signal correctly represents the bus data when a dominant bus fault (described below) occurs.

More specifically, in accordance with example implementations, the bus interface 140 logically ANDs the data signals from the buses 150-1 and 1502 together to provide a data signal, which accurately represents, or indicates, the bus data, for 1. the case of no bus faults occurring; and for 2. the case of a recessive bus fault (described below) occurring in one of the buses 150-1 and 150-2.

A recessive bus fault with a given bus 150 occurs when the differential data line pair of the bus 150 always indicates a recessive bit (a logic one), regardless of the data being driven onto the bus 150 by the transmitting node 104. Thus, when a given bus 150 experiences a recessive fault, the data signal from the bus 150 indicates, or represents, a successive stream of logic ones. As examples, a recessive fault may be caused by an open circuit or a short between two lines of the bus 150 to cause the differential data line pair of the bus 150 to continuously indicate a recessive (logic one) bit.

A data signal formed by logically ANDing the received data signals from the buses 150 together accurately indicates, or represents, the correct, or intended, bus data, when no faults are present and also accurately indicates the correct data if one of the buses 150 experiences a recessive fault. For example, if the intended data bit is a logic zero and if no recessive fault occurs, the ANDing operation of logic zero bits from both buses 150 correctly produces a logic zero bit. If a recessive fault occurs with one of the buses 150, the bus experiencing the fault 150 continuously indicates a logic one bit. However, the ANDing of the logic one bit (from the bus 150 with the recessive fault) and the logic zero bit (from the bus 150 not having a fault) also produces the correct logic zero bit. If the intended data bit is a logic one, if no recessive fault occurs, the ANDing operation of logic one bits from both buses 150 correctly produces a logic one bit. If a recessive fault occurs with one of the buses 150, the ANDing of the logic one bit (from the bus 150 with the recessive fault) and the logic one bit (from the bus 150 not having a fault) also produces the correct logic one bit.

The above-described logical ANDing, however, fails to accommodate dominant fault on one of the buses 150. A dominant bus fault with a given bus 150 occurs when the differential data line pair of the bus 150 indicates a dominant bit (a logic zero bit), regardless of the data being driven onto the bus 150 by the transmitting node 104. Thus, when a given bus 150 experiences a dominant fault, a successive stream of logic zeros are received as the data from the bus 150. A dominant fault may occur on a given bus 150 when, for example, a line of the bus 150 contacts a power rail. The logical ANDing does not accommodate the dominant fault because the logical ANDing of the data signals from the buses 150-1 and 150-2 produces a constant stream of logic zeros due to a "zero" being an input to the ANDing.

In accordance with example implementations that are disclosed herein, in additional to logically ANDing the data signals from the buses 150, the bus interface 140 also logically ORs the data signals together to produce an alternate bus data signal for the controller 134. This alternate data signal accurately indicates, or represents, the intended bus data, in the event of a dominant fault. In this manner, if the intended data bit is a logic zero and a dominant fault occurs with one of the buses 150, the bus experiencing the fault 150 continuously indicates a logic zero bit, regardless of the data being driven onto the bus 150 by the transmitting node 104. However, the ORing of the logic zero bit (from the bus 150 with the dominant fault) and the logic zero bit (from the bus 150 not having a fault) produces the correct logic zero bit. If the intended data bit is a logic one and a dominant fault occurs with one of the buses 150, the ORing of the logic zero bit (from the bus 150 with the dominant fault) and the logic one bit (from the bus 150 not having a fault) produces the correct logic one bit.

Thus, in accordance with example implementations, the bus interface 140 produces two potential bus data input signals for selection by the bus controller 134: a first signal generated by the interface 140 logically ANDing the data signals received from the buses 150 together; and a second signal produced by the interface 140 logically ORing the data signals together. The bus controller 134 interprets the data signals that are provided by the bus interface 140 (and thus, selects the appropriate signal as its bus data input signal) based at least in part on whether or not a dominant fault has been detected.

In this regard, if no dominant fault is detected, the bus controller 134 selects the bus data input signal derived from the logical ANDing of the bus data signals. It is noted that this selected signal is not prone to recessive faults and as such, accurately indicates the intended bus data for the case of no faults and also for the case of a recessive fault. When, however, a dominant fault is detected, the controller 134 selects the alternate bus data input signal derived from the logical ORing of the bus data signals together. As described above, this logically ORed signal accurately indicates the intended bus data in the presence of a dominant fault.

Figure 3A:
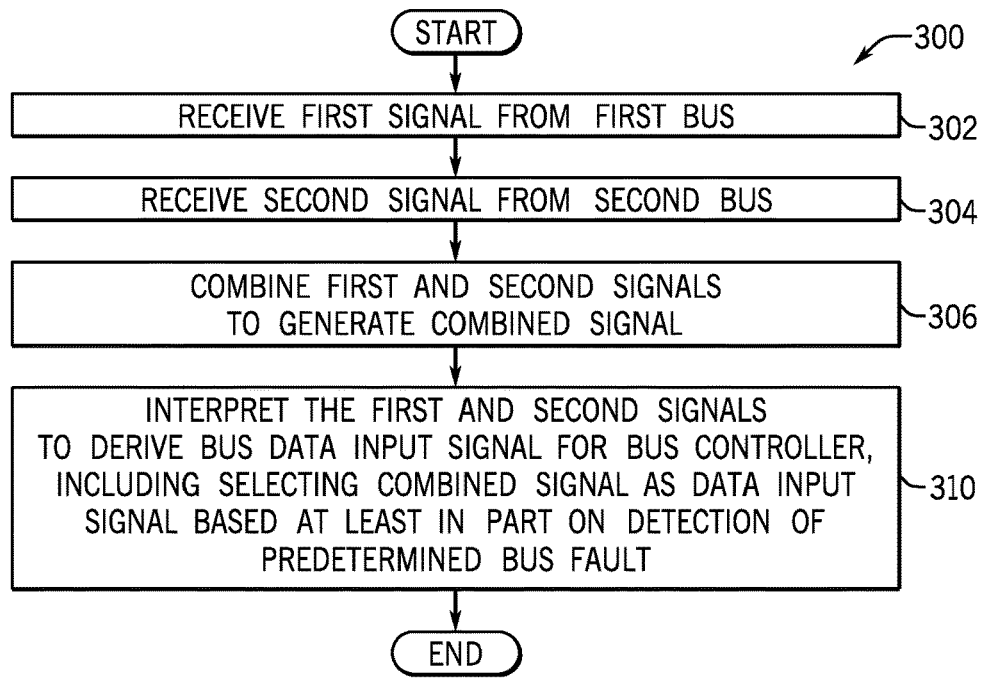
FIGS. 3A, 3B, 4 and 7 are flow diagrams depicting techniques to interpret signals received from redundant buses according to example implementations.

Referring to FIG. 3A in conjunction with FIG. 1, thus, in accordance with example implementations, a technique 300 includes receiving (block 302) a first signal from a first bus and receiving (block 304) a second signal from a second bus. Pursuant to the technique 300, the first and second signals are combined (block 306) to generate a combined signal; and the first and second signals are interpreted (block 310) to derive a bus data input signal for a bus controller, where the interpretation includes selecting the combined signal as the bus data input signal based at least in part on whether a predetermined bus fault has been detected.

Figure 3B:
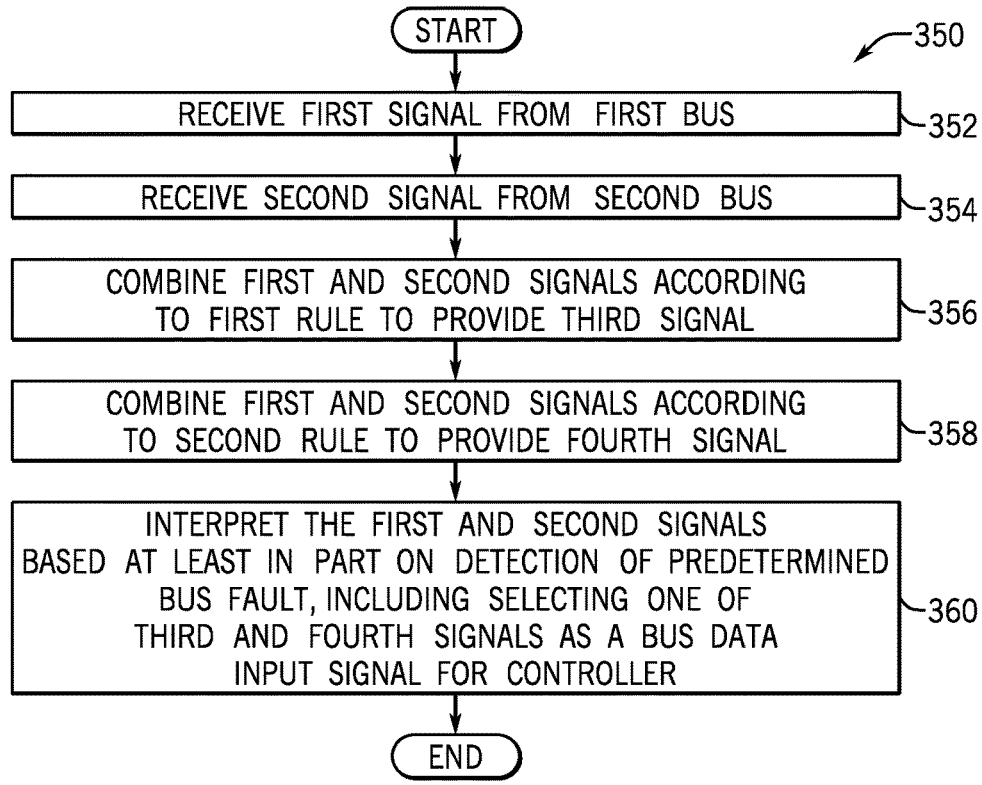

More specifically, referring to FIG. 3B in conjunction with FIG. 1, in accordance with example implementations, a technique 350 includes receiving (block 352) a first signal from a first bus and receiving (block 354) a second signal from a second, redundant bus. Pursuant to the technique 350, the first and second signals are combined (block 356) according to a first rule to provide a third signal and combined (block 358) according to a second rule to provide a fourth signal. The technique 350 includes selectively interpreting the third and fourth signals based at least in part on the detection of a predetermined bus fault, including selecting one of the third and fourth signals as a bus data input signal for a controller, pursuant to block 360.

In accordance with example implementations, the node 104 (such as example node 104-1, which is depicted in more detail in FIG. 1) is a physical machine that includes hardware 112 and machine executable instructions 130, or "software." The hardware 112 may include, as an example a processor 110. As a more specific example, the processor 110 may include one or multiple central processing unit (CPU)-based processing cores 114, counters 116, timers 118, one or more analog-to-digital converters (ADCs) 120, and so forth. In accordance with example implementations, the processor 110 may be a microcontroller, although the processor 110 may assume other forms, in accordance with further implementations.

As depicted in FIG. 1, in accordance with example implementations, the processing core(s) 114 may execute a specific set of machine executable instructions (e.g., "software" or "firmware") to form the bus controller 134. In general, the bus controller 134 controls the packaging of data into messages to be communicated using the buses 150; the reception of messages from the buses 150; the queuing of the received messages for processing by a host 132 (described below); the signaling protocols for bus communications; the selection of the appropriate ORed or ANDed input signal from the bus interface 140; and so forth.

As also depicted in FIG. 1, the processing core(s) 114 may execute another set of machine executable instructions to form the host 132. In general, the host 132 may perform a variety of different processing functions for the node 104, such as message processing for messages received from and transmitted to the buses 150; controlling operations and receiving data from various peripheral devices 146 (sensors, actuators, and so forth) of the node 104; and so forth.

Although FIG. 1 depicts the host 132 and bus controller 134 as being formed from a sole processor 110 (a microcontroller, for example), the host 132 and bus controller 134 may be formed form separate processing entities, in accordance with further example implementations.

Figure 2:
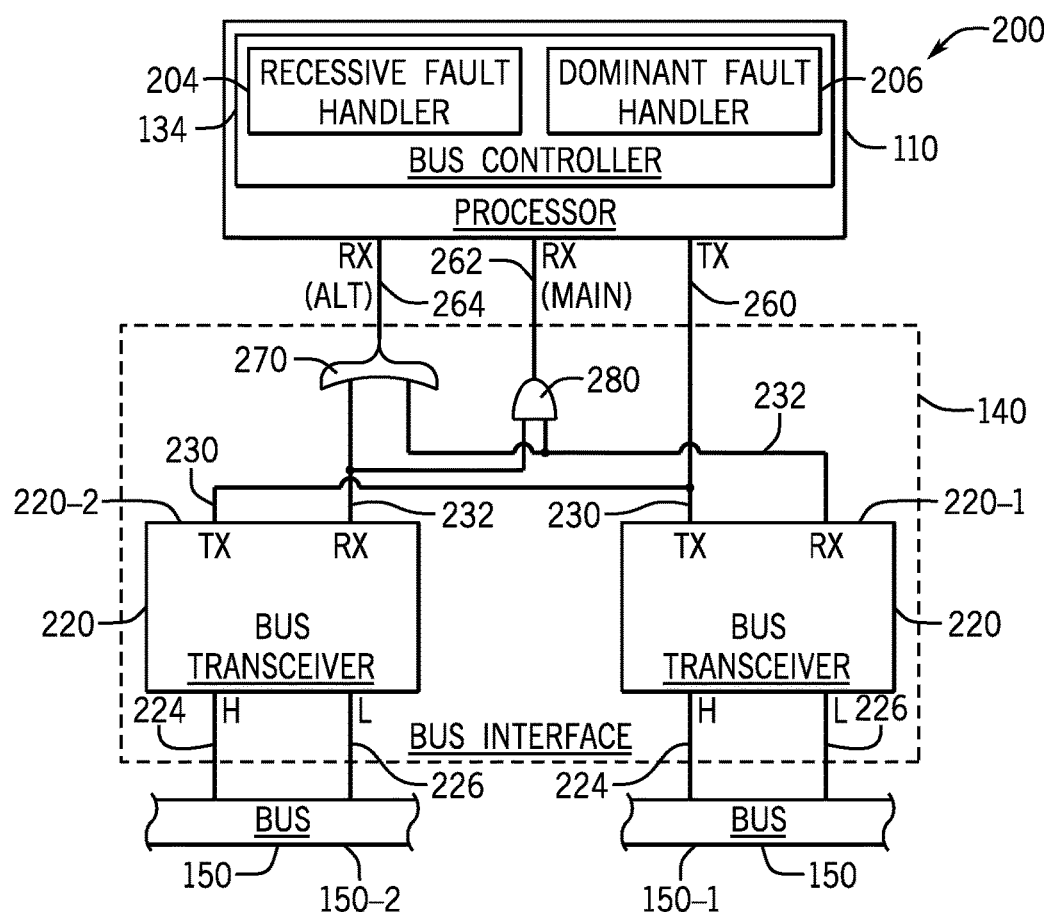
FIG. 2 is a schematic diagram of a CAN bus controller and a CAN bus interface of a node of the computer system of FIG. 1 according to an example implementation.

Referring to FIG. 2, in accordance with example implementations, the processor 110 and bus interface 140 may have an exemplary architecture 200. In general, the bus controller 134 includes a dominant fault handler 206, which is constructed to detect when a dominant fault occurs with one of the buses 150 so that the bus controller 134 may select the appropriate bus data input signal for the bus controller 134. The dominant fault handler 206 may be formed by the execution of a set of machine executable instructions by CPU processing core(s) 114 of the processor 110, in accordance with example implementations.

More specifically, in accordance with example implementations, the dominant fault handler 206 may be triggered in response to a periodic software timer interrupt to determine if no bus packets have been sent or received for a given interval of time. The standard for the buses 150, in accordance with some implementations, may impose a certain minimum bus activity level. Should a dominant fault occur, the data that is received due to the logical ANDing of signals results in a constant stream of logic zeros and as such, results in no packets being received. Therefore, upon detecting that no packets have been received in a given time interval, the dominant fault handler 206 signals a dominant fault, which causes the bus controller 134 to switch from receiving logically ANDed data signals from the buses 150-1 and 150-2 (the default selection, for example) to receiving logically ORed data signals from the buses 150-1 and 150-2.

More specifically, as depicted in FIG. 2, in accordance with example implementations, the processor 110 has a communication output 260 (a general purpose input/output (GPIO) pin, for example) that is driven by the bus controller 134 with the data to be communicated to the buses 150; a primary, or main, receive input 262 (a GPIO pin, for example), which receives a signal produced by the logical ANDing of the data signals from the buses 150; and an alternate data input 264 (a GPIO pin, for example), which receives a signal produced by the logical ORing of the data signals from the buses 150-1 and 150-2. For purposes of receiving bus data, the dominant fault handler 206 configures the bus controller 134 to receive the data via the primary input 262 if no dominant fault is detected. If, however, the dominant fault handler 206 detects a dominant fault, the handler 206 configures the bus controller 134 to alternatively receive its data from the buses 150-1 and 150-2 using the alternate receive input 264.

In accordance with example implementations, the bus interface 140 includes bus transceivers 220 (two bus transceivers 220-1 and 220-2, being depicted as examples in FIG. 2), which are coupled to the buses 150-1 and 150-2, respectively. For data reception, the bus transceiver 220, in general, differentially detects data from its bus 150 and provides a corresponding signal on its output 232 indicative of the received data. For data transmission, the transceiver 220 also differentially drives a particular logic level onto its associated bus 150 in response to a logic signal being driven by the processor 110 onto the transmit input 230 of the transceiver 220. As depicted in FIG. 2, the bus transceiver 220 has associated high 224 and low 226 lines coupled to the differential data lines of its associated bus 150. The transceiver 220 provides the appropriate voltage translations between the bus 150 and inputs/outputs of the processor 110.

Thus, the receive outputs 232 of the bus transceivers 220 provide signals that represent the data sensed from the associated buses 150. The bus interface 140 includes an AND gate 280, which has inputs that are coupled to the receive outputs 232 of the transceivers 220. An output terminal of the AND gate 280 is coupled to the primary bus data input 262 of the processor 110 and provides a signal to the processor input 262, which indicates, or represents, the logical ANDing of the data signals that are received from the buses 150-1 and 150-2. The bus interface 140 further includes an OR gate 270, which has inputs that are coupled to the receive outputs 232 of the transceivers 220. An output terminal of the OR gate 270 is coupled to the alternate data input 264 of the processor 110. Therefore, the OR gate 270 provides a signal that represents, or indicates, the logical ORing of the data signals that are received from the buses 150.

Figure 4:
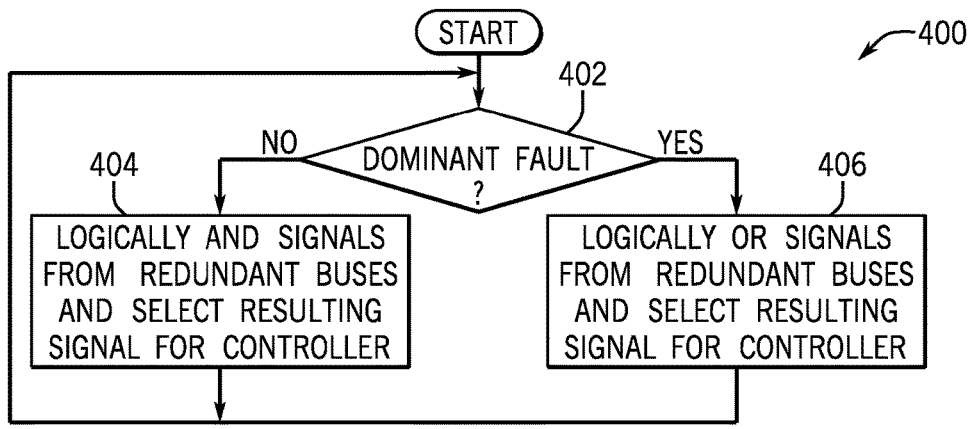

Referring to FIG. 4 in conjunction with FIG. 2, in accordance with example implementations, the bus controller 134 and dominant fault handler 206 interact according to a technique 400. Pursuant to the technique 400, a determination is made (decision block 402) whether a dominant fault is present. If not, the signals from the redundant buses are logically ANDed (block 404) and the resulting signal is selected as the bus data input signal for the bus controller 134. If, however, a dominant fault is detected (decision block 402), the technique 400 includes logically ORing the signals from the redundant buses together and selecting the resulting signal as the bus data input signal for the bus controller, pursuant to block 406.

Referring to FIG. 2 in conjunction with FIG. 1, in accordance with example implementations, the bus controller 134 may enter a diagnostic mode, in which a recessive fault handler 204 of the bus controller 134 detects for the presence of a recessive fault. The recessive fault handler 204 may be formed by the execution of a set of machine executable instructions by CPU processing core(s) 114 of the processor 110, in accordance with example implementations.

More specifically, in accordance with example implementations, the recessive fault handler 204 detects recessive faults by listening for heartbeat messages in the diagnostic mode. In this manner, each node 104 may periodically transmit a "heartbeat" message, which uniquely identifies the node 104 as existing on the buses 150. For purposes of detecting a recessive fault and further determining which bus devices, if any, are affected by a recessive bus fault, the recessive fault handler 204 uses this diagnostic node to compare the set of bus devices identified using the signal received at the input 264 (the ORed signal) to the set of bus devices identified using the signal received at the input 262 (the ANDed signal). In this manner, if the recessive fault handler 204 "sees" a given bus device's heartbeat message using the input 264 but does not see "see" the device's heartbeat message using the alternate input 264, then the handler 204 flags the device as being impacted by a recessive bus fault. In this context, a "bus device" may be a node 104, a peripheral, a port 146 or any other software or hardware entity that communicates via the bus 150.

In accordance with example implementations, the frequency of the heartbeat messages may be accelerated for purposes of reducing the time for bus fault detection. It is noted that the nodes 104 may employ the above-described recessive bus fault detection for purposes of building a connectivity map between every possible combination of devices. This map may, in accordance with example implementations, allow the localization of a given recessive bus fault.

Figure 5:
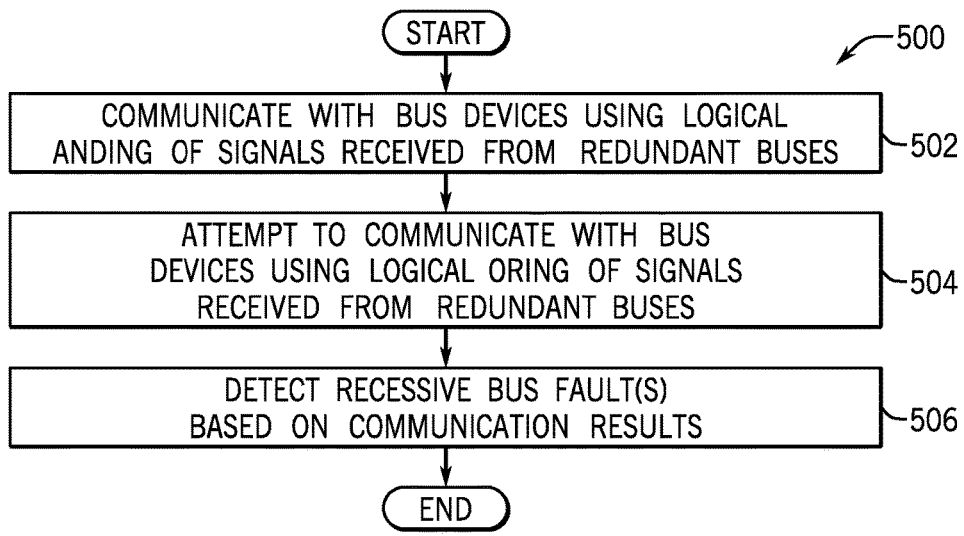
FIG. 5 is a flow diagram depicting a technique to identify bus device(s) having impaired communications due to a recessive bus fault according to an example implementation.

Thus, referring to FIG. 5, in accordance with example implementations, in general, a technique 500 includes communicating (block 502) with bus devices using logical ANDing of signals that are received from redundant buses and attempting (block 504) to communicate with the bus devices using logical ORing of signals received from the redundant buses. Pursuant to block 506, a recessive bus fault is detected based on the communication results.

Figure 6:
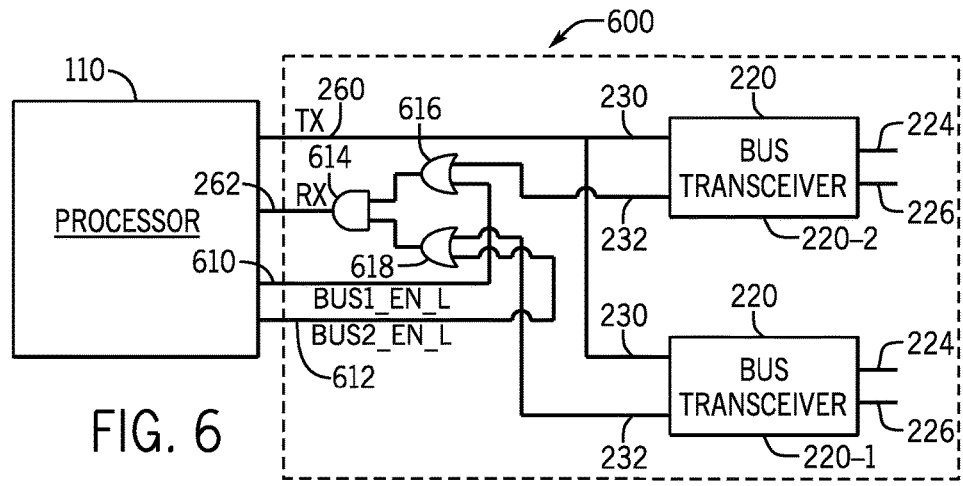
FIG. 6 is a schematic diagram of a CAN bus controller and CAN bus interface according to a further example implementation.

In accordance with a further example implementation, intermittent faults may be mitigated using a bus interface 600 (replacing the bus interface 140, for example) that is depicted in FIG. 6. In this regard, "intermittent faults" refer to faults that alternate between dominant and recessive states. As an example, a case for intermittent faults may occur for a completely disconnected/unterminated CAN bus line. To accommodate these intermittent faults, the bus interface 600 allows three possible modes of reception. In the first mode, an AND gate 614 of the bus interface 600 provides a bus data input signal to the receive input 262 of the processor 110, which is an ANDed version of the signals provided by the receive outputs 232 of the bus transceivers 220-1 and 220-2. This mode of reception is for the case in which no faults are present or one of the buses 150 experiences a recessive fault. If, however, a dominant fault is detected, then a second or a third mode of reception is used. With the second mode of reception, for this example, the receive output 232 from the bus transceiver 220-1 is used. In the third mode, the receive output 232 from the bus transceiver 220-2 is used.

In this manner, the bus interface 600 includes OR gates 616 and 618 for purposes of solely selecting the receive output 232 from a given bus transceiver 220 for the receive input 262 to the processor 110. As depicted in FIG. 6, the OR gate 616 includes one input that is coupled to the receive output 232 of the bus transceiver 220-2; and likewise, one input of the OR gate 618 is coupled to the receive output 232 of the transceiver 220-1. Another input of the OR gate 616 is coupled to a bus enable output 610 of the processor 110; and likewise, another input of the OR gate 618 is coupled to a bus enable output 612 of the processor 110. The output terminals of the OR gates 616 and 618 are provided as inputs to the AND gate 614. The processor 110 selectively de-asserts (drives to a logic zero, for example) the bus enable output 610 and 612 for purposes of selecting one of the receive outputs 232. For example, when the processor 110 de-asserts the output 610, this selects the receive output 232 of the bus transceiver 220-1. When the processor 110 de-asserts the output 612, this selects the receive output 232 of the bus transceiver 220-2.

Figure 7:
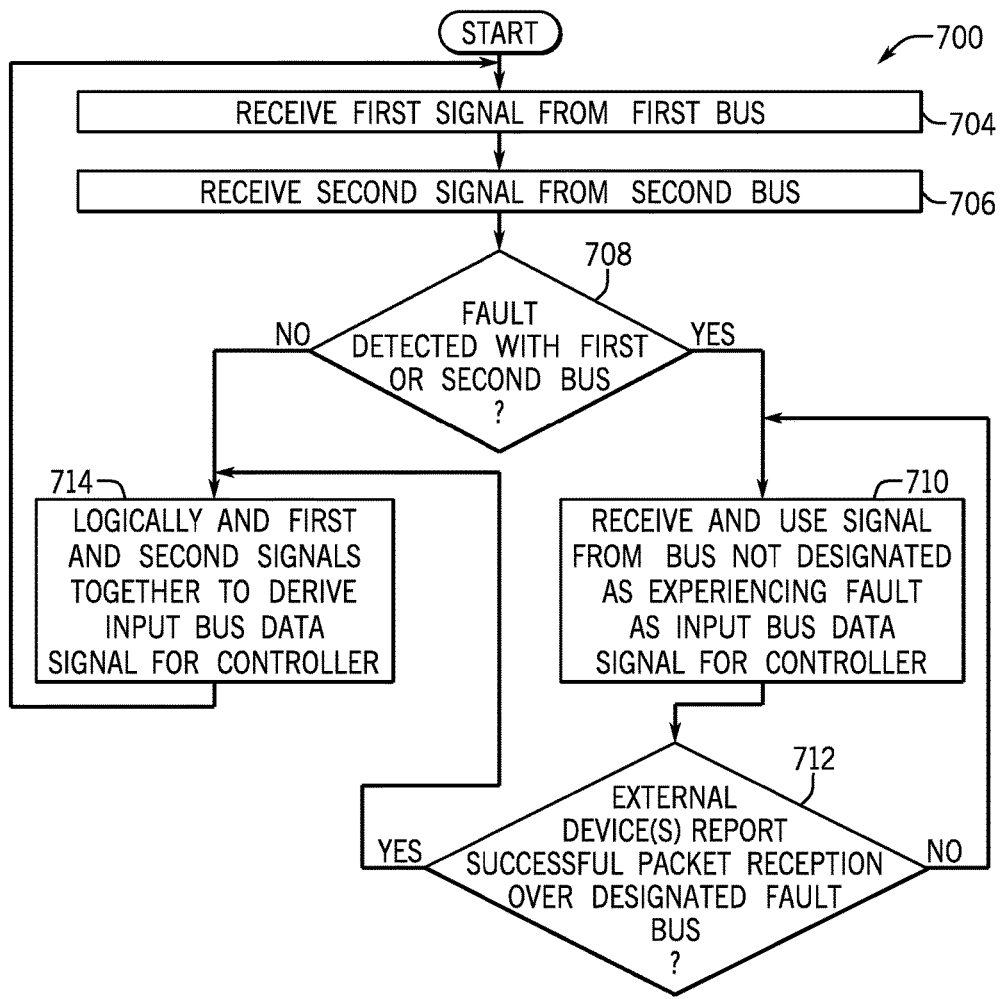

The processor 110 performs a technique 700 that is depicted in FIG. 7 for purposes of handling intermittent faults, in accordance with example implementations. Pursuant to the technique 700, a first signal is received from the first bus, pursuant to block 704; and a second signal is received from a second bus, pursuant to block 706. If a determination is made (decision block 708) that a fault is detected with the first or second bus, then the signal from the bus not designated as experiencing the fault is received and used, pursuant to block 710. This continues until the fault is resolved or another bus device reports (decision block 712) that a packet has been successfully received over the designated fault bus. Thus, if in decision block 708 a fault is not detected with either the first or second bus or successive packet reception occurs over a previously-designated fault bus, the technique 700 includes logically ANDing the first and second signals from the first and second buses together to derive an input bus data signal for the controller, pursuant to block 714.

Among the advantages of the systems and techniques that are disclosed herein, recessive and dominant fault tolerance may be incorporated into a system at a relatively low cost; a standard transceiver may be used; recessive and dominant fault tolerance may be provided using a single power domain supply; relatively few microcontroller pins (three, for example) may be used to implement the recessive and dominant fault tolerance; and so forth. Other and different advantages are contemplated, in accordance with the scope of the appended claims.

While a limited number of examples have been disclosed herein, those skilled in the art, having the benefit of this disclosure, will appreciate numerous modifications and variations therefrom. It is intended that the appended claims cover all such modifications and variations.

What is claimed is:

1. A method comprising:
   receiving a first signal from a first bus;
   receiving a second signal from a second bus, the first and second buses being used for redundant communications;
   deriving a bus data input signal as a logical ANDing of the first and second signals or as a logical ORing of the first and second signals, based on whether a predetermined bus fault has been detected; and
   transmitting the bus data input signal to a controller.

2. The method of claim 1, wherein:
   in absence of the predetermined bus fault, the first and second buses are each adapted to communicate a recessive logic value and communicate a dominant logic value; and
   the predetermined bus fault comprises a dominant bus fault such that when the dominant bus fault occurs with one of the first and second buses, the bus with which the fault occurs communicates dominant logic values independently of a signal being furnished to the bus by a transmitter.

3. The method of claim 1, wherein deriving the bus data input signal comprises:
   deriving the bus data input signal as the logical ORing of the first and second signals responsive to detection of the predetermined bus fault; and
   deriving the bus data input signal as the logical ANDing of the first and second signals responsive to an absence of detection of the predetermined bus fault.

4. The method of claim 2, further comprising:
   determining whether communication over the first and second buses by a given bus device is impaired due to a recessive fault with one of the first and second buses, the recessive fault causing the bus with which the recessive fault occurs to communicate recessive logic values regardless of signals being furnished to the bus by the given bus device, wherein determining whether the communication by the given bus device is impaired due to the recessive bus fault comprises:
      determining whether both the combined and fourth signals may be used to communicate with the given bus device.

5. The method of claim 1, wherein the controller controls a device in accordance with the derived bus data input signal.

6. The method of claim 1, wherein the derived bus data input signal is a correct base data signal regardless of whether the predetermined bus fault has occurred.

7. An apparatus comprising:
a fault detector to detect a predetermined fault occurring with a set of redundant buses, wherein the set of redundant buses comprises a first bus and a second bus, the first bus providing a first signal and the second bus providing a second signal;
a bus interface to logically AND the first and second signals to provide a third signal and logically OR the first and second signals to provide a fourth signal; and
a processor to communicate with the set of redundant buses, the processor to transmit one of the third and fourth signals as a bus data input signal to a controller based on whether the fault detector detects the predetermined fault.

8. The apparatus of claim 7, wherein:
in absence of the predetermined bus fault, the first and second buses are each adapted to communicate a recessive logic value and communicate a dominant logic value; and
the predetermined bus fault comprises a dominant bus fault such that when the dominant bus fault occurs with one of the first and second buses, the bus with which the fault occurs communicates dominant logic values independently of a signal being furnished to the bus by a transmitter.

9. The apparatus of claim 8, further comprising:
a recessive fault detector to detect a recessive fault, wherein the recessive fault occurs with one of the first and second buses when the bus with which the recessive fault occurs communicates recessive logic values independently of a signal being furnished to the bus by a transmitter.

10. An article comprising a non-transitory computer readable storage medium to store instructions that when executed by a computer cause the computer to:
detect a predetermined fault occurring with a set of redundant buses, wherein the set of redundant buses comprises a first bus and a second bus, the first bus providing a first signal and the second bus providing a second signal; and
derive a bus data input signal as a logical ANDing of the first and second signals or as a logical ORing of the first and second signals, based on whether the predetermined fault has been detected; and
transmit the bus data input signal to a controller.

11. The article of claim 10, the storage medium storing instructions that when executed by the computer cause the computer to detect the predetermined fault by detecting an absence of communication over the first and second buses for a predetermined time interval.

* * * * *